Figure 1:
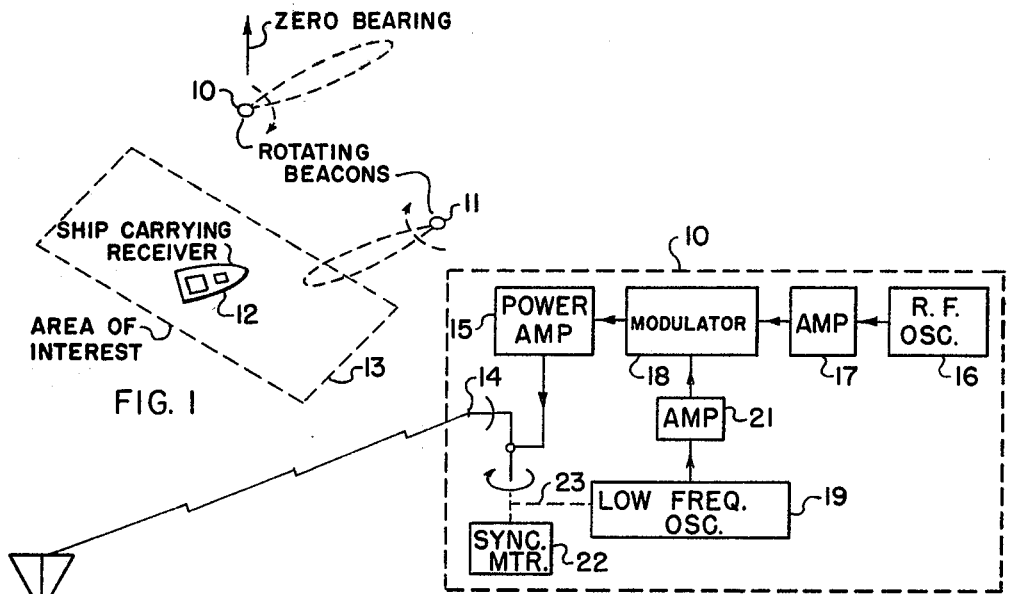

Aug. 16, 1966     R. T. GALLOWAY     3,267,473

BEARING INDICATING RADIO BEACON

Filed April 26, 1963

*INVENTOR.*
RICHARD T. GALLOWAY
BY

ATTORNEYS

United States Patent Office 3,267,473
Patented August 16, 1966

3,267,473
BEARING INDICATING RADIO BEACON
Richard T. Galloway, Panama City, Fla., assignor to the United States of America as represented by the Secretary of the Navy
Filed Apr. 26, 1963, Ser. No. 276,113
1 Claim. (Cl. 343—106)

The invention described herein may be manufactured and used by or for the Government of the United States for governmental purposes without the payment of any royalties thereon or therefor.

The present invention relates to a bearing indicating method and system and more particularly to such a method and system employing a transmitter and a receiver for providing at the receiver station an indication of the azimuth bearing with respect to the transmitting station. Systems for locating the angular disposition of a mobile station with respect to a stationary control station are known in which a rotating antenna emitting a beam of energy of small angular width cooperates with a mobile receiving station for giving a bearing indication. By utilizing two transmitting stations located in accurately known positions, position fixes can repeatedly be obtained for the mobile station. While such known systems are usually accurate enough for general navigational purposes, they are not designed to provide the preciseness of navigation frequently desired in restricted channels and in certain operations such as mine sweeping and mine hunting where it is highly important that an area be covered completely with a minimum of overlap, i.e., a ship's track should be known with great accuracy. Accordingly, an object of the invention is to increase the accuracy of bearing information obtained from a rotating beam of radiant energy.

Another object of the invention is to provide a radio beacon transmitter in which the radiated beam signal has a characteristic corresponding to the angle the axis of the beam makes with a known fixed direction.

A further object of the invention is to locate accurately the central axis of a rotating beam of radiant energy.

The invention as well as other objects and advantages thereof will become evident from the following specification and its scope will be pointed out in the appended claim.

In accordance with the present invention each radio beacon transmits radiant energy amplitude-modulated at a frequency which varies linearly with the angular rotation of the beam from a preselected zero bearing, the arrangement being such that depending on the frequency range selected, each corresponding fraction of a degree of rotation will carry with it a unique modulation frequency of the beam. Radiant beams of the order of 10° to 20° wide are readily obtainable and if it is rotated one revolution a second, a bearing reading can be taken once each second. Assuming a symmetrical directivity pattern for the radiated beam the bearing information contained in the beam is accurate only for the center of the beam and in accordance with a preferred embodiment of the invention the center of the beam is indirectly determined by counting the number of modulation cycles received during each sweep of the beam signal and timing the interval during which the counting takes place, the bearing from the beacon to the receiver being the total modulation cycle count divided by the time interval in suitable units determined by the period of the highest modulation frequency to be received in the navigated area, i.e., the area of interest. Thus in an installation in which one cycle change in the modulation frequency of the beam signal occurs for each change of 0.1° in bearing the frequency range of the modulation signal can be chosen such that the received modulation frequency is numerically equal to ten times the bearing in degrees and hence requires a minimum of interpretation.

Figure 2:
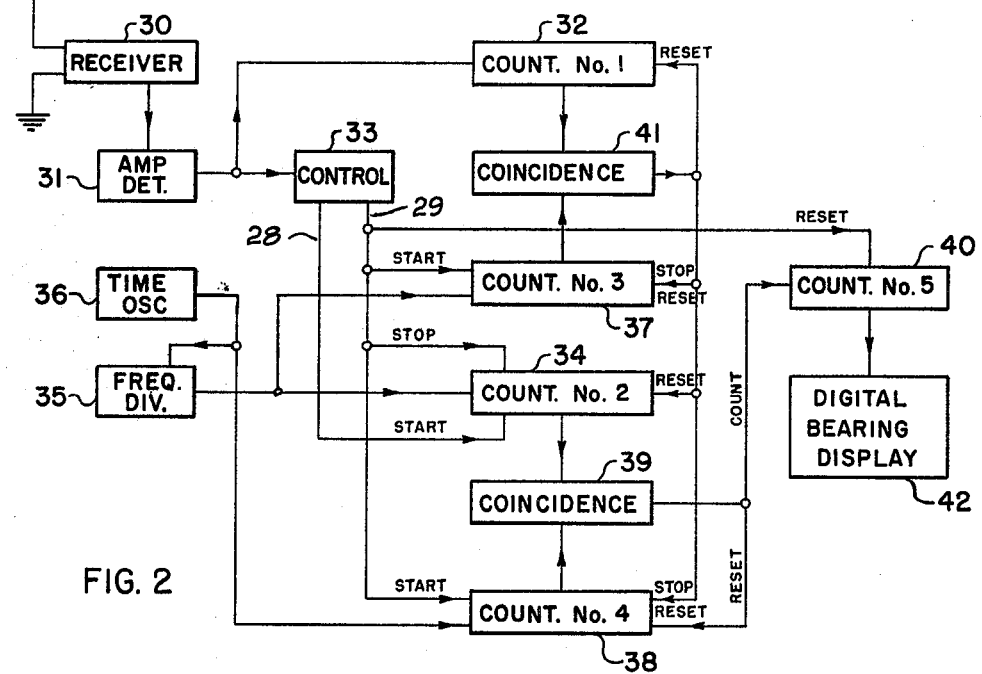

The invention will be described in greater detail with reference to the accompanying drawing in which FIG. 1 is a map illustrating the radiation patterns of signals utilized in determining the positional location of a mobile station; and FIG. 2 is a block schematic diagram of a bearing indicating system showing the mechanical and electrical components of the beacon and of the mobile receiver.

Referring to FIG. 1 of the drawing, two rotating beacons 10 and 11 are located in accurately known positions for providing a mobile station 12 with information for navigating within an area of interest 13. Both beacons 10 and 11 may be given the same zero bearing, e.g., north, but as will be pointed out below, it may be desirable to select the zero bearing direction so that in the area of interest 13 the magnitude of the relative bearings will be as small as is practicable. Also in order that a single receiver may be employed on the ship 12, the rotation of the two beacons 10 and 11 are preferably so synchronized that their radiated beams will always differ about 180° in bearing one from the other as indicated in FIG. 1.

As shown in FIG. 2, the rotating beacon 10 may comprise a directional antenna 14 driven by a power amplifier 15 connected to a source of carrier frequency 16 through an amplifier 17 and a modulator 18. The carrier wave from the oscillator 16 is amplitude-modulated in the modulator 18 in accordance with the output of a low frequency oscillator 19 and applied to the modulator 18 through an amplifier 21. A synchronous motor 22, through a shaft 23, cyclically varies the frequency output of the low frequency oscillator 19, and in fixed relation therewith rotates the antenna 14 in such manner that for each angular position of the antenna 14 a characteristic or unique modulation frequency is imposed on the transmitted beam.

The angular disposition or bearing of a ship-carried receiver with respect to the beacon 10 may be accurately determined in a manner now to be described. The modulated rotating beam signal received by the receiver 30 on the craft 12 is applied to an amplifier detector circuit 31, the detected output of which is applied directly to a first counter 32 which counts the modulation cycles received between the leading and trailing edges of the beam signal as it sweeps by the receiver 30 at a known angular rate. Simultaneously, the detected leading edge of the beam signal is applied to a pulse forming control circuit 33, e.g., a monostable multivibrator, which initiates a pulse on an output lead 28 to start a second counter 34 counting cycles from a frequency divider 35 connected to a time oscillator or clock 36. This latter counting by the counter 34 continues until the control circuit 33 provides on its output lead 29, a pulse corresponding to the trailing edge of the received beam signal which pulse stops the second counter 34, starts third and fourth counters 37 and 38 connected to the frequency divider 35 and the time oscillator 36, respectively, and resets a fifth counter 40. The first and second counters 32 and 34 hold their counts until the third and fourth counters 37 and 38 perform a division operation and register the quotient on the fifth counter 40. In this division operation, the divisor, i.e., the time interval between the leading and trailing edges of the beam signal, is the count held on the second counter 34 and the dividend, i.e., the number of modulation cycles counted in this time interval, is the count held on the first counter 32. When the fourth counter 38 counting the cycles of the oscillator 36 reaches the count held on the second counter 34 a pulse coincidence circuit 39 produces an output signal which advances the fifth counter 40 one count and resets the fourth counter 38 to again count to coincidence until stopped as now to be described. When the third counter 37 reaches a count equal to the count held on the first counter 32, a pulse coincidence circuit 41 produces an output signal which resets the first and second counters 32 and 34 and stops and resets the third and fourth counters 37 and 38. This action completes the division operation and the count registered on the fifth counter 40 represent the digital bearing and may be suitably shown on a digital bearing display 42. By proper choice of the frequency range of the oscillator 19, the digital bearing displayed can be made numerically equal to a tenth power of the bearing expressed in degrees. It will be noted that the signal from the control 33 which starts the third and fourth counters 37 and 38 for a new bearing computation will also reset the fifth counter 40 for repeating the above described cycle of operation.

In selecting certain parameters such as the change in modulation frequency per degree of rotation, speed of beam rotation, beam width and time interval measurement accuracy, they should be correlated with the accuracy desired in bearing measurement and the number of significant digits required in the division process. In those situations where the design of the system can be arranged such that the bearings required are all less than 100° the required number of significant digits for the same accuracy is one less than for larger bearings. The use of the frequency divider 35 introduces a vernier effect which increases the accuracy to which the time interval may be measured.

*Example (bearing in 0.1°)*

Modulation frequency of beam increases 1000 c.p.s./degree.
Beam is 10° wide and rotates 360° per second.
Time oscillator 36 has a frequency of one megacycle.
Frequency divider 35 has an output frequency of ten kilocycles.
Count on No. 2 is $100/360 \times 10{,}000 = 277$.

Assume the count on No. 1 is 833, then,

No. 3 counts to 833 in .0833 second.
No. 4 counts 277 three hundred times in .0833 second.
No. 5 counts to 300 corresponding to the bearing 30.0°.

From the foregoing example, it will be evident that the angular rate of rotation of the beam need not be known at the mobile station but of course the rate of rotation should be substantially constant.

Although time-interval meters normally have their own time base oscillators, the beam passage interval could be determined by counting the cycles of the beacon-carrier signal whose frequency is known. The average modulation frequency during the passage of the beam could also be determined by direct frequency measurement for short counting intervals and displaying the median measurement from a memory bank or averaging all measurements. Or an adjustable counting interval made equal to the interval required for the beam passage could be used with a readout calibrated in average frequency for the entire interval. It is obvious that the counting rate and time interval accuracy requirements can be reduced by reducing the speed of rotation of the beacon.

Present day mine countermeasures ships are being provided with substantial computer facilities which can be utilized as a component of the mobile stations for counting the modulation cycles during one passage of the beam from the rotating beam and dividing the total count by the time interval the counting took place.

While for the purpose of disclosing the invention, a specific embodiment thereof has been described in detail, it will be obvious to those skilled in the art that the invention is not thereby limited but is of the scope of the appended claim.

What is claimed is:

A system for determining the bearing of a mobile station relative to a fixed point including
 a radio beacon at said fixed point,
 said radio beacon comprising
  means for radiating a directive beam of signal energy,
  means for rotating said beam about said fixed point, and
  means synchronized with said rotating means for modulating the amplitude of said beam at a frequency which varies linearly with the angular rotation of said beam from a preselected zero bearing,
 a receiver at said mobile station comprising
  first means for counting the modulation cycles received during one period of reception of said beam,
  second means for counting at a fixed rate during said one period of reception,
  third means operative at the end of said one period of reception to count at a fixed rate to the number equal to the number of modulation cycles counted by said first means to establish a time interval,
  fourth means operative coincident with said established time interval to count repetitively to the number equal to the count on said second means, and
  fifth means for registering the number of repetitive counts of said fourth means as a measure of the relative bearing of said mobile station with respect to said zero bearing.

References Cited by the Examiner
UNITED STATES PATENTS

| | | | |
|---|---|---|---|
| 2,402,410 | 6/1946 | Kear | 343—106 |
| 2,502,448 | 4/1950 | Frum | 343—106 |
| 2,702,367 | 2/1955 | Ergen | 324—68 |
| 2,851,596 | 9/1958 | Hilton | 324—68 |
| 3,202,994 | 8/1965 | Fombonne | 343—106 |

CHESTER L. JUSTUS, *Primary Examiner.*
H. C. WAMSLEY, *Assistant Examiner.*